US008116475B2

(12) United States Patent
Teng

(10) Patent No.: US 8,116,475 B2
(45) Date of Patent: Feb. 14, 2012

(54) AUDIO GENERATING MODULE

(75) Inventor: Cheng-Yung Teng, Taipei County (TW)

(73) Assignee: Princeton Technology Corporation, Taipei County (TW)

( * ) Notice: Subject to any disclaimer, the term of this patent is extended or adjusted under 35 U.S.C. 154(b) by 957 days.

(21) Appl. No.: 12/114,441

(22) Filed: May 2, 2008

(65) Prior Publication Data

US 2009/0168605 A1 Jul. 2, 2009

(30) Foreign Application Priority Data

Dec. 26, 2007 (TW) .............................. 96222168 U

(51) Int. Cl.
*H04B 3/00* (2006.01)

(52) U.S. Cl. ........................................................ 381/77

(58) Field of Classification Search ..................... 381/77
See application file for complete search history.

(56) References Cited

U.S. PATENT DOCUMENTS

| | | | | |
|---|---|---|---|---|
| 6,987,992 | B2 * | 1/2006 | Hundal et al. | 455/569.1 |
| 7,773,761 | B2 * | 8/2010 | Sun et al. | 381/77 |
| 2004/0208324 | A1 * | 10/2004 | Cheung et al. | 381/77 |
| 2004/0247140 | A1 * | 12/2004 | Norris et al. | 381/77 |
| 2007/0015485 | A1 * | 1/2007 | DeBiasio et al. | 455/345 |
| 2007/0274532 | A1 * | 11/2007 | Adachi et al. | 381/77 |
| 2008/0008338 | A1 * | 1/2008 | Yoon et al. | 381/303 |
| 2009/0215436 | A1 * | 8/2009 | Howard et al. | 455/414.3 |
| 2009/0226000 | A1 * | 9/2009 | Kadar | 381/77 |
| 2010/0054096 | A1 * | 3/2010 | Kiyama | 369/47.15 |

* cited by examiner

*Primary Examiner* — Thao P. Le
(74) *Attorney, Agent, or Firm* — Muncy, Geissler, Olds & Lowe, PLLC

(57) ABSTRACT

An audio generating module is disclosed comprising a transmitting medium, a power unit and a transmitting unit. The power unit is used for providing power. The transmitting unit, situated in the transmitting medium, connects to the power unit for receiving power, and generating an audio in the transmitting medium according to a preset mechanism.

5 Claims, 1 Drawing Sheet

AUDIO GENERATING MODULE

BACKGROUND

The invention relates to an audio generating module, and in particular, to an audio generating module capable of generating and playing audio signals.

This section is intended to introduce the reader to various aspects of art, which may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Conventionally, an audio player comprises an amplifier for amplifying audio signals, and a speaker for playing the audio signals. Accordingly, an amplifier and a speaker are required, thus a lot of space is taken. This causes limitations in utilization. For example, an electronic ink display device cannot play audio signals because it does not have enough space for an amplifier and a speaker. Accordingly, the electronic ink display device is capable of displaying images, but not audio signals.

Accordingly, an audio player with limited space requirement is needed.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

An audio generating module comprises a transmitting medium, a power unit and a transmitting unit. The power unit is used for providing power. The transmitting unit, situated in the transmitting medium, connects to the power unit for receiving power, and generating an audio in the transmitting medium according to a preset mechanism.

BRIEF DESCRIPTION OF DRAWINGS

The invention can be more fully understood by reading the subsequent detailed description and examples with references made to the accompanying drawings, wherein.

DETAILED DESCRIPTION

Figure 1:
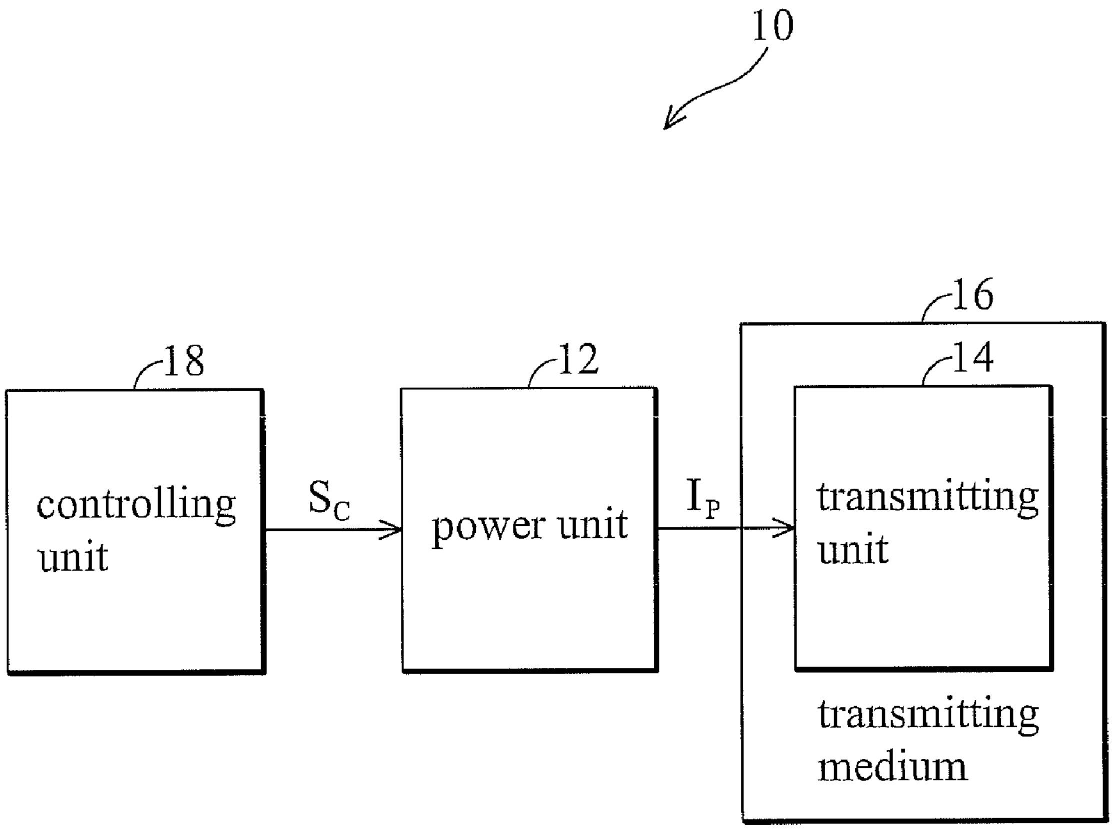
FIG. 1 illustrates a schematic view of an embodiment of an audio generating module.

One or more specific embodiments of the invention are described below. In an effort to provide a concise description of these embodiments, not all features of an actual implementation are described in the specification. It should be appreciated that in the development of any such actual implementation, as in any engineering or design project, numerous implementation-specific decisions must be made to achieve specific developer goals, such as compliance with system-related and business-related constraints, which may vary from one implementation to another. Moreover, it should be appreciated that such a development effort might be complex and time consuming, but would nevertheless be a routine undertaking of design, fabrication, and manufacturing for those of ordinary skill having the benefit of this disclosure.

In the following detailed description, reference is made to the accompanying drawings which form a part hereof, shown by way of illustration of specific embodiments. These embodiments are described in sufficient detail to enable those skilled in the art to practice the invention, and it is to be understood that other embodiments may be utilized and that structural, logical and electrical changes may be made without departing from the spirit and scope of the invention. The following detailed description is, therefore, not to be taken in a limiting sense. The leading digit(s) of reference numbers appearing in the figures corresponds to the figure number, with the exception that the same reference number is used throughout to refer to an identical component which appears in multiple figures. It should be understood that many of the elements described and illustrated throughout the specification are functional in nature and may be embodied in one or more physical entities or may take other forms beyond those described or depicted.

Referring to FIG. 1, FIG. 1 illustrates a schematic view of an embodiment of an audio generating module. According to this embodiment, an audio generating module 10 is provided, comprising a transmitting medium 16, a power unit 12, and a transmitting unit 14. The power unit 12 provides power Ip. The transmitting unit 14 is situated in the transmitting medium 16. The transmitting unit 14 connects to the power unit 12 for receiving power Ip, and generates an audio in the transmitting medium 16 according to a preset mechanism.

According to an embodiment, the power Ip is an electronic current. The transmitting unit 14 comprises at least a coil. The transmitting medium 16 comprises air. The preset mechanism utilizes a wave motion. The at least one coil generates a magnetic field in response to receiving the power Ip from the power unit 12. The magnetic field causes a wave motion in the transmitting medium 16, thereby audio is generated accordingly. Here, the transmitting medium 16 is air. The at least one coil is wound in loops. Accordingly, the space enclosed by the loop-shaped coil is sufficient for wave motion of air, thereby generating audio.

In addition, the audio generating module 10 further comprises a controlling unit 18. The controlling unit 18 is connected to the power unit 12. The controlling unit 18 generates a plurality of control signals Sc, wherein the control signals Sc cause the power unit 12 to generate power with different intensities. Different audio can be generated according to power with different intensities. Accordingly, the audio generating module 10 can generate corresponding audio when electronic currents with different intensities are input to the at least one coil.

According to the embodiment, the audio generating module generates a magnetic field when the electronic current goes through the at least one coil. A wave motion is generated in air serving as a transmitting medium and audio is generated accordingly. In addition, different audio can be generated according to power with different intensities. Therefore, a new method of generating audio is provided for reducing space requirement of circuits of an audio player.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An audio generating module, comprising:

a transmitting medium;

a power unit providing power;

a controlling unit, connecting to the power unit, for generating a plurality of control signals, wherein the control signals cause the power unit to generate power with different intensities; and a transmitting unit, situated in the transmitting medium, connecting to the power unit for receiving power, and generating an audio in the transmitting medium according to a preset mechanism.

2. The audio generating module of claim 1, wherein the transmitting unit comprises at least one coil.

3. The audio generating module of claim 1, wherein the transmitting medium comprises air.

4. The audio generating module of claim 3, wherein the preset mechanism utilizes a wave motion.

5. The audio generating module of claim 4, wherein the transmitting unit further generates a magnetic field according to the received power for generating the wave motion in the air.

* * * * *